United States Patent
Kikuchi et al.

(10) Patent No.: US 8,141,380 B2
(45) Date of Patent: Mar. 27, 2012

(54) AIR REFRIGERANT TYPE COOLING APPARATUS AND AIR REFRIGERANT COOLING/HEATING SYSTEM USING REFRIGERANT TYPE COOLING APPARATUS

(75) Inventors: Shigemitsu Kikuchi, Kangawa (JP); Seiichi Okuda, Kanagawa (JP)

(73) Assignees: Mitsubishi Heavy Industries, Ltd., Tokyo (JP); International Center for Environmental Technology Transfer, Mie (JP)

( * ) Notice: Subject to any disclaimer, the term of this patent is extended or adjusted under 35 U.S.C. 154(b) by 820 days.

(21) Appl. No.: 11/658,844

(22) PCT Filed: Jul. 27, 2005

(86) PCT No.: PCT/JP2005/013714
§ 371 (c)(1),
(2), (4) Date: Oct. 28, 2008

(87) PCT Pub. No.: WO2006/011501
PCT Pub. Date: Feb. 2, 2006

(65) Prior Publication Data
US 2009/0217693 A1   Sep. 3, 2009

(30) Foreign Application Priority Data

Jul. 30, 2004 (JP) .................................. 2004-224940

(51) Int. Cl.
 *F25D 9/00* (2006.01)
(52) U.S. Cl. ......... 62/402; 62/238.2; 62/478; 417/410.1
(58) Field of Classification Search ................ 62/238.2, 62/402, 478; 417/410.1
See application file for complete search history.

(56) References Cited

U.S. PATENT DOCUMENTS 5,248,239 A * 9/1993 Andrews ................... 415/104
5,884,498 A * 3/1999 Kishimoto et al. .......... 62/228.1
(Continued)

FOREIGN PATENT DOCUMENTS

JP        11-132582        5/1999
(Continued)

*Primary Examiner* — Melvin Jones
(74) *Attorney, Agent, or Firm* — Kanesaka Berner & Partners, LLP

(57) ABSTRACT

The purpose present invention is to provide an air refrigerant type cooling apparatus provided with an internal air cooling mechanism with high reliability and efficiency. Another object of the present invention is to provide an air refrigerant cooling/heating system with a simplified configuration using the air refrigerant type cooling apparatus. To accomplish the purpose, a heat radiating means is provided in a motor of an air refrigerant type cooling apparatus having a compressor, the motor and an expansion turbine in the present invention. Also, a pressure difference is positively generated between the inside and outside of the motor. By these means, when the motor is driven, the heat from the stator main body is exhausted to the outside of the motor through the heat radiating means and the heat from the coil end portions is exhausted through the cooling air exhausted from the inside to the outside of the motor. Further, a guide plate is located adjacent to the cooling air inlet in the motor, so that the intake cooling air is efficiently guided to the stator coil end portions. By this means, the heat generated from the coil end portions is efficiently exhausted from the inside to the outside of the motor. According to these configurations, an air refrigerant cooling apparatus can be realized. Moreover, by installing the air refrigerant cooling apparatus to a cooling/heating system, an air refrigerant cooling/heating system having simple configuration and very high reliability can be provided.

9 Claims, 8 Drawing Sheets

U.S. PATENT DOCUMENTS

2004/0260388 A1 * 12/2004 Thompson .................. 623/1.15

FOREIGN PATENT DOCUMENTS

| JP | 11-159898 | 6/1999 |
| JP | 11-159898 A | 6/1999 |
| JP | 2002-058205 | 2/2002 |
| JP | 2002-058205 A | 2/2002 |
| JP | 2002-138962 | 5/2002 |
| JP | 2002-138962 A | 5/2002 |
| JP | 2003-009455 | 1/2003 |
| JP | 2003-009455 A | 1/2003 |
| JP | 2003-158839 | 5/2003 |
| JP | 2003-158839 A | 5/2003 |

* cited by examiner

AIR REFRIGERANT TYPE COOLING APPARATUS AND AIR REFRIGERANT COOLING/HEATING SYSTEM USING REFRIGERANT TYPE COOLING APPARATUS

CROSS-REFERENCE TO RELATED APPLICATIONS

The present Application is based on International Application No. PCT/JP 2005/013714, filed on Jul. 27, 2005, which in turn corresponds to Japanese Application No. 2004-224940, filed on Jul. 30, 2004, and priority is hereby claimed under 35 USC §119 based on these applications. Each of these applications are hereby incorporated by reference in their entirety into the present application.

TECHNICAL FIELD

The present invention relates to an air refrigerant type cooling apparatus including an air cooling mechanism in a motor, and an air refrigerant type cooling/heating system which uses the air refrigerant type cooling apparatus including the air cooling mechanism in the motor.

BACKGROUND ART

An air refrigerant cooling/heating system is composed of an air refrigerant type cooling apparatus, a heat exchanger, and a cooling chamber, and an object thereof is to sustain products which are stored in the cooling chamber and required to be frozen to be at low temperatures.

In a freezing device used in a conventional cooling/heating system, a stator portion of a motor is water-cooled (or oil-cooled) in order to cool down the driving motor. Alternatively, as shown in an air cooling motor 1 in FIG. 1, an external fin 5 is connected to the outside of a stator casing 6, and the air cooling motor 1 is air-cooled as a whole by an air cooling fan 2 installed in the main shaft 7 via the external fin 5.

In the conventional air cooling motor 1, a stator is a main heat generating portion, and in comparison with a stator coil main body 4 and a stator coil end portion 3 which are configuration requirements of the stator, the stator coil main body 4 has a higher heating ratio. Therefore, the stator coil main body 4 is connected to the stator casing 6, and the external fin 5 connected to the outside of the stator casing 6 is simply cooled down by the air cooling fan 2 so that cooling the motor as a whole is achieved.

However, there is a demand in recent years to enhance efficiency of the air refrigerant cooling/heating system and store products at much lower temperatures. In order to meet the demand, it is necessary to enhance efficiency and improve reliability of the air refrigerant type cooling apparatus, in addition to increase performance thereof.

For efficiency improvement in the air refrigerant type cooling apparatus, it is considered to increase a rotation speed of the motor, and in order to sustain the high speed rotation, it is necessary to enhance heat exhausting efficiency in the inside of the motor for reliability enhancement and improve reliability in a supporting mechanism of the main shaft being a rotational driving portion of the motor.

However, if the motor is controlled by using a general-purpose inverter panel while rotating the motor at a high speed, the frequency of the inverter needs to be lowered by reducing the number of poles of the motor. If the pole number of the motor is reduced, a ratio of the length in the stator coil end portion is increased to the length of the stator main body in the configuration of the motor. If the ratio of the length in the stator coil end portion is increased, a heating value from the stator coil end portion is increased at the time of driving the motor, so that it is insufficient in the conventional motor cooling method to cool down the motor as a whole.

In relation to the technique described above, there are proposals as follows.

An air cooling motor disclosed in Japanese Laid Open Patent Application (JP-P 2003-158839A) includes a plurality of cooling holes provided along the shaft direction of a stator core composed of a laminated core, a motor shaft to which a rotor core to be composed of a laminated core and provided via a magnetic air gap from the stator core is bonded in the outer periphery, a load-side bracket for supporting a front end portion of the stator core by protruding a front end portion of the motor shaft, an anti-load-side bracket for supporting a rear end portion of the stator core by protruding a rear end portion of the motor shaft, a housing provided in the outer periphery of the anti-load-side bracket via a space so as to seal the rear end portion of the stator core, and a fan unit having a forced air cooling fan in the rear of the housing. In the air cooling motor configured to cause cooling air to flow from the cooling holes toward the space surrounded by the housing and the load-side bracket, the load-side bracket and the anti-load-side bracket have a plurality of cooling holes, and have a guide which is arranged to guide cooling air introduced from the cooling holes of the load-side bracket to the motor shaft, and to cover coils provided in the stator core, so that proposed there is the air cooling motor provided with a plurality of through holes in the motor shaft to allow cooling air introduced from the cooling holes of the load-side bracket to flow toward the cooling holes of the anti-load-side bracket.

Moreover, in relation to the air refrigerant cooling/heating system using an air refrigerant type freezing device, an air refrigerant type freezing device disclosed in Japanese Laid Open Patent Application (JP-A-Heisei, 11-132582) includes a compressor, an air cooler, an air-to-air heat exchanger, and an expander to be disposed in an air passage in the order of air flow, in which air in a chamber required to be cooled is introduced to the compressor via the air-to-air heat exchanger, and air from the expander is blown into the chamber required to be cooled. The air refrigerant type freezing device to be proposed is further provided with a interposal first bypass for returning the air from the expander partially or entirely back to the air-to-air heat exchanger while bypassing the chamber required to be cooled, and an interposal hot air bypath for introducing air of 0° C. or above from the air passage between the compressor and the expander and providing the air for the air passage in the inlet side of the air-to-air heat exchanger.

DISCLOSURE OF INVENTION

An object of the present invention is to provide an air refrigerant type cooling apparatus provided with a motor internal air cooling mechanism with high reliability and efficiency. Another object of the present invention is to provide an air refrigerant cooling/heating system with a simplified configuration using the air refrigerant type cooling apparatus.

In order to realize the above described objects, the air refrigerant type cooling apparatus according to the present invention includes a motor which have a motor casing, a main shaft inserted into the motor casing, a stator coil stored in the motor casing configured to rotate the main shaft, and a heat radiating means adapted to radiate heat accumulated in the stator coil; a compressor connected to the motor in a first shaft direction thereof; an expansion turbine connected to the motor in a second shaft direction thereof; and a means adapted to generate a pressure difference between the inside and outside of the motor.

Moreover, in the air refrigerant type cooling apparatus according to the present invention, the stator coil includes a stator coil main body, and stator coil end portions to be symmetrically positioned in the shaft direction across the stator coil main body, in which the heat radiating means is disposed between the stator coil main body and the motor casing, and the means adapted to generate a pressure difference between the inside and outside of the motor uses an external pressure from the outside of the motor to generate, via a first intake hole and a second intake hole arranged in the motor casing, a pressure difference between the outside of the motor and a space with the heat radiating means and the stator coil end portion being disposed.

The air refrigerant type cooling apparatus according to the present invention is further provided with a guide plate which is disposed in the motor casing and controls the direction of an air flow generated by an external pressure from the outside of the motor between the outside of the motor and the space with the heat radiating means and the stator coil end portion being disposed.

Moreover, the heat radiating means according to the air refrigerant type cooling apparatus in the present invention uses a cooling fin for heat radiation.

Also, the air refrigerant type cooling apparatus according to the present invention includes a motor casing, a main shaft inserted into the motor casing, a stator coil stored in the motor casing for driving the main shaft to rotate, a motor which is stored in the motor casing and provided with a heat radiating means adapted to radiate heat accumulated in the stator coil, a compressor connected to the motor in a first shaft direction thereof, an expansion turbine connected to the motor in a second shaft direction thereof, and a means adapted to generate a pressure difference between the inside and outside of the motor.

Meanwhile, an air refrigerant cooling/heating system according to the present invention includes the air refrigerant type cooling apparatus, a first heat exchanger, a second heat exchanger, a cooling chamber, a filter and a fan, in which an outlet of the compressor in the air refrigerant type cooling apparatus is connected to an inlet of the first heat exchanger, an outlet of the first heat exchanger is connected to an inlet of the second heat exchanger, the outlet of the second heat exchanger is connected to the inlet of an expansion turbine in the air refrigerant type cooling apparatus, the outlet of the expansion turbine in the air refrigerant type cooling apparatus is connected to an inlet of the cooling chamber, an outlet of the cooling chamber is connected to an inlet of the compressor in the air refrigerant type cooling apparatus via the second heat exchanger, and the first intake hole provided in the motor casing is connected to the fan via the filter, while heat generated in the inside of the motor is exhausted from the second intake hole provided in the motor casing, in order to cool down the inside of the motor in the air refrigerant type cooling apparatus.

Also, an air refrigerant cooling/heating system according to the present invention includes the air refrigerant type cooling apparatus, the first heat exchanger, the second heat exchanger, and the cooling chamber, in which the outlet of the compressor in the air refrigerant type cooling apparatus is connected to the inlet of the first heat exchanger, the outlet of the first heat exchanger is connected to the inlet of the second heat exchanger, the outlet of the second heat exchanger is connected to the inlet of the expansion turbine in the air refrigerant type cooling apparatus, the outlet of the expansion turbine in the air refrigerant type cooling apparatus is connected to the inlet of the cooling chamber, the outlet of the cooling chamber is connected to the inlet of the compressor in the air refrigerant type cooling apparatus via the second heat exchanger, and a pipe connected to the outlet of the expansion turbine in the air refrigerant type cooling apparatus is branched, connecting the branched pipe to the first intake hole arranged in the motor casing of the air refrigerant type cooling apparatus, while the second intake hole arranged in the motor casing of the air refrigerant type cooling apparatus is connected to the inlet of the compressor in the air refrigerant type cooling apparatus, in order to cool down the inside of the motor in the air refrigerant type cooling apparatus.

Also, an air refrigerant cooling/heating system according to the present invention includes the air refrigerant type cooling apparatus, the first heat exchanger, the second heat exchanger, the cooling chamber, and a radiator, in which the outlet of the compressor in the air refrigerant type cooling apparatus is connected to the inlet of the first heat exchanger, the outlet of the first heat exchanger is connected to the inlet of the second heat exchanger, the outlet of the second heat exchanger is connected to the inlet of the expansion turbine in the air refrigerant type cooling apparatus, the outlet of the expansion turbine in the air refrigerant type cooling apparatus is connected to the inlet of the cooling chamber, the outlet of the cooling chamber is connected to the inlet of the compressor in the air refrigerant type cooling apparatus via the second heat exchanger, and the radiator is disposed in the outside of the air refrigerant type cooling apparatus, connecting an inlet and outlet of the radiator to the intake holes arranged in a motor casing to correspond to the inlet and the outlet of the radiator respectively, in order to cool down the inside of the motor in the air refrigerant type cooling apparatus.

Also, an air refrigerant cooling/heating system according to the present invention includes the air refrigerant type cooling apparatus, the first heat exchanger, the second heat exchanger, and the cooling chamber, in which the outlet of the compressor in the air refrigerant type cooling apparatus is connected to the inlet of the first heat exchanger, the outlet of the first heat exchanger is connected to the inlet of the second heat exchanger, the outlet of the second heat exchanger is connected to the inlet of the expansion turbine in the air refrigerant type cooling apparatus, the outlet of the expansion turbine in the air refrigerant type cooling apparatus is connected to the inlet of the cooling chamber, the outlet of the cooling chamber is connected to the inlet of the compressor in the air refrigerant type cooling apparatus via the second heat exchanger, and the pipe connected to the outlet of the second heat exchanger is branched, connecting the branched pipe to the first intake hole arranged in the motor casing of the air refrigerant type cooling apparatus, while the second intake hole arranged in the motor casing of the air refrigerant type cooling apparatus is connected to the inlet of the compressor in the air refrigerant type cooling apparatus, in order to cool down the inside of the motor in the air refrigerant type cooling apparatus.

Meanwhile, a refrigerating container according to the present invention includes the air refrigerant type cooling apparatus, the first heat exchanger, the second heat exchanger, a container box, and the radiator, in which the outlet of the compressor in the air refrigerant type cooling apparatus is connected to the inlet of the first heat exchanger, the outlet of the first heat exchanger is connected to the inlet of the second heat exchanger, the outlet of the second heat exchanger is connected to the inlet of the expansion turbine in the air refrigerant type cooling apparatus, the outlet of the expansion turbine in the air refrigerant type cooling apparatus is connected to the inlet of the container box, the outlet of the container box is connected to the inlet of the compressor in the air refrigerant type cooling apparatus via the second heat exchanger, and the radiator is disposed in the outside of the air refrigerant type cooling apparatus, connecting the inlet and outlet of the radiator to the intake holes arranged in the motor casing to correspond to the inlet and outlet of the radiator respectively, in order to cool down the inside of the motor in the air refrigerant type cooling apparatus, so that the configuration is further made to be portable as the refrigerator container including the air refrigerant type cooling apparatus, the first heat exchanger, the second heat exchanger, the container box, and the radiator.

With the above described configuration elements and the operation principle according to the present invention, it is possible to provide the highly reliable air refrigerant type cooling apparatus having the effective motor internal air cooling mechanism. It is also possible to provide the highly reliable air refrigerant cooling/heating system with a simplified configuration using the air refrigerant type cooling apparatus described above.

BEST MODE FOR CARRYING OUT THE INVENTION

Explained below will be a best mode for carrying out an air refrigerant type cooling apparatus including a motor interior air cooling mechanism, and an air refrigerant cooling/heating system which uses the air refrigerant type cooling apparatus including the motor interior air cooling mechanism according to the present invention referring to attached drawings.

Figure 1:
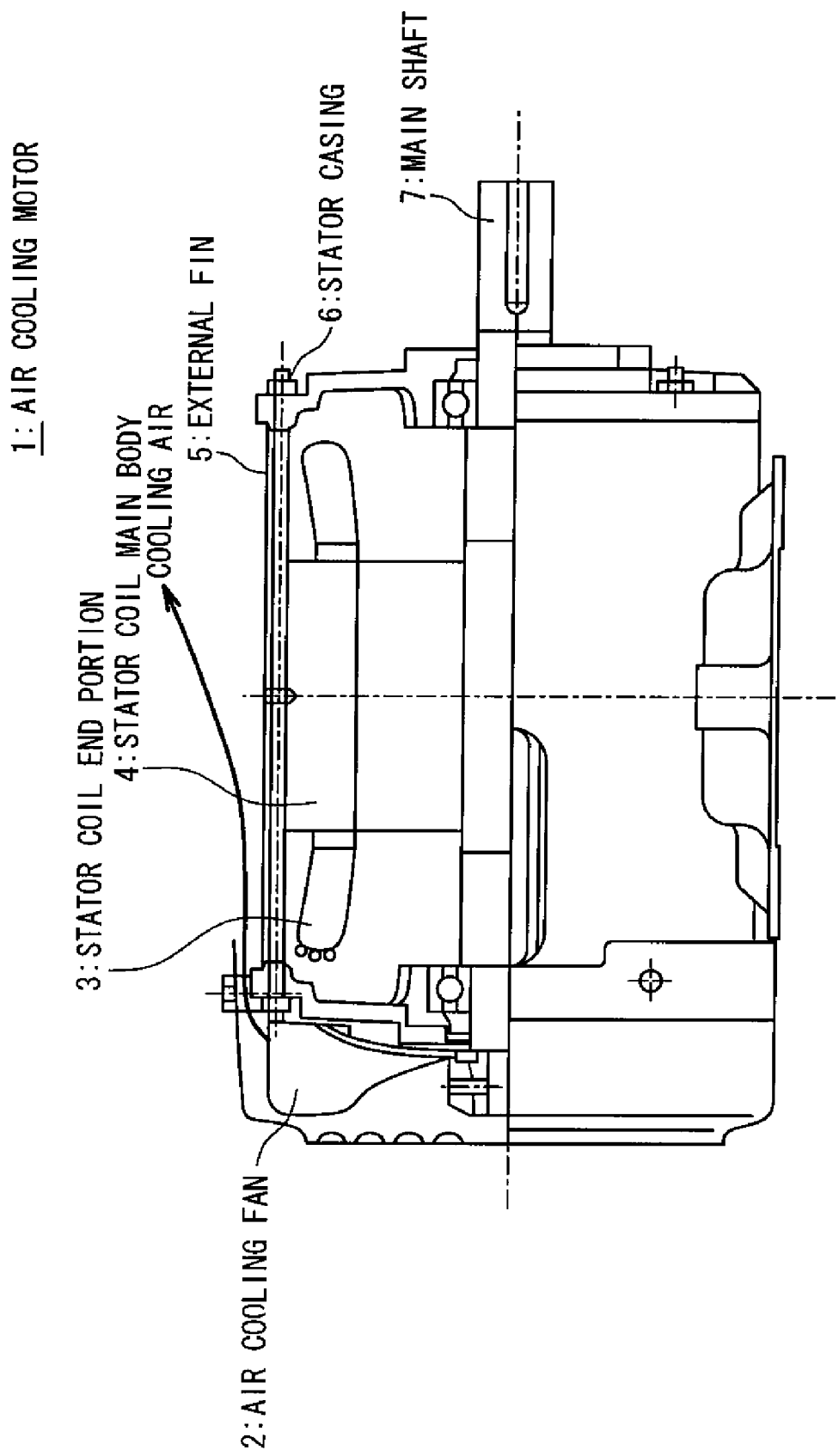
FIG. 1 is a cross sectional diagram showing a schematic configuration of a conventional air cooling motor.
Figure 2:
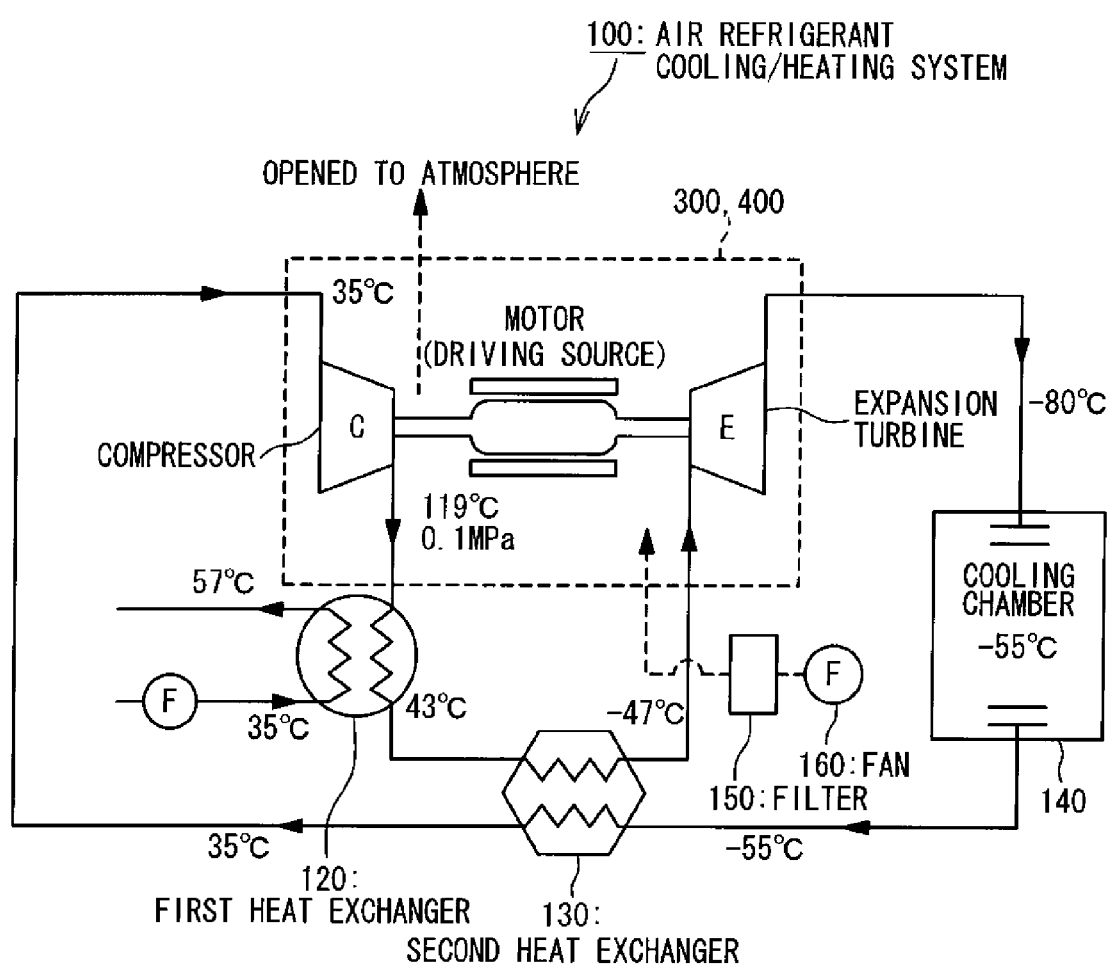
FIG. 2 is an air refrigerant cooling/heating system according to the third embodiment.

First explained will be an air refrigerant type cooling apparatus including the motor interior air cooling mechanism, and the air refrigerant cooling/heating system which uses the air refrigerant type cooling apparatus including the motor interior air cooling mechanism for the purpose of taking a general view of an entire configuration of the present invention. FIG. 2 shows an air refrigerant cooling/heating system 100 according to the third embodiment of the present invention. The air refrigerant cooling/heating system 100 according to the present invention includes air refrigerant type cooling apparatuses 300 and 400, a first heat exchanger 120, a second heat exchanger 130, and a cooling chamber 140. The air refrigerant type cooling apparatuses 300 and 400 includes a compressor, a motor and an expansion turbine.

In the air refrigerant cooling/heating system 100 according to the present invention, air which was compressed by the compressor in the air refrigerant type cooling apparatuses 300 and 400 is cooled down by the first heat exchanger 120. This cooled air is further subjected to heat exchange with air from the cooling chamber 140 in the second heat exchanger 130, and adiabatically expanded by the expansion turbine in the air refrigerant type cooling apparatuses 300 and 400 so as to be cooled down to a low temperature (−80° C.). Thereafter, the air at a low temperature is directly sent to the cooling chamber 140 so that products stored in the cooling chamber 140 are held at a low temperature. A detailed operation principle of the air refrigerant cooling/heating system 100 will be explained in the third embodiment.

(First Embodiment)

Figure 3:
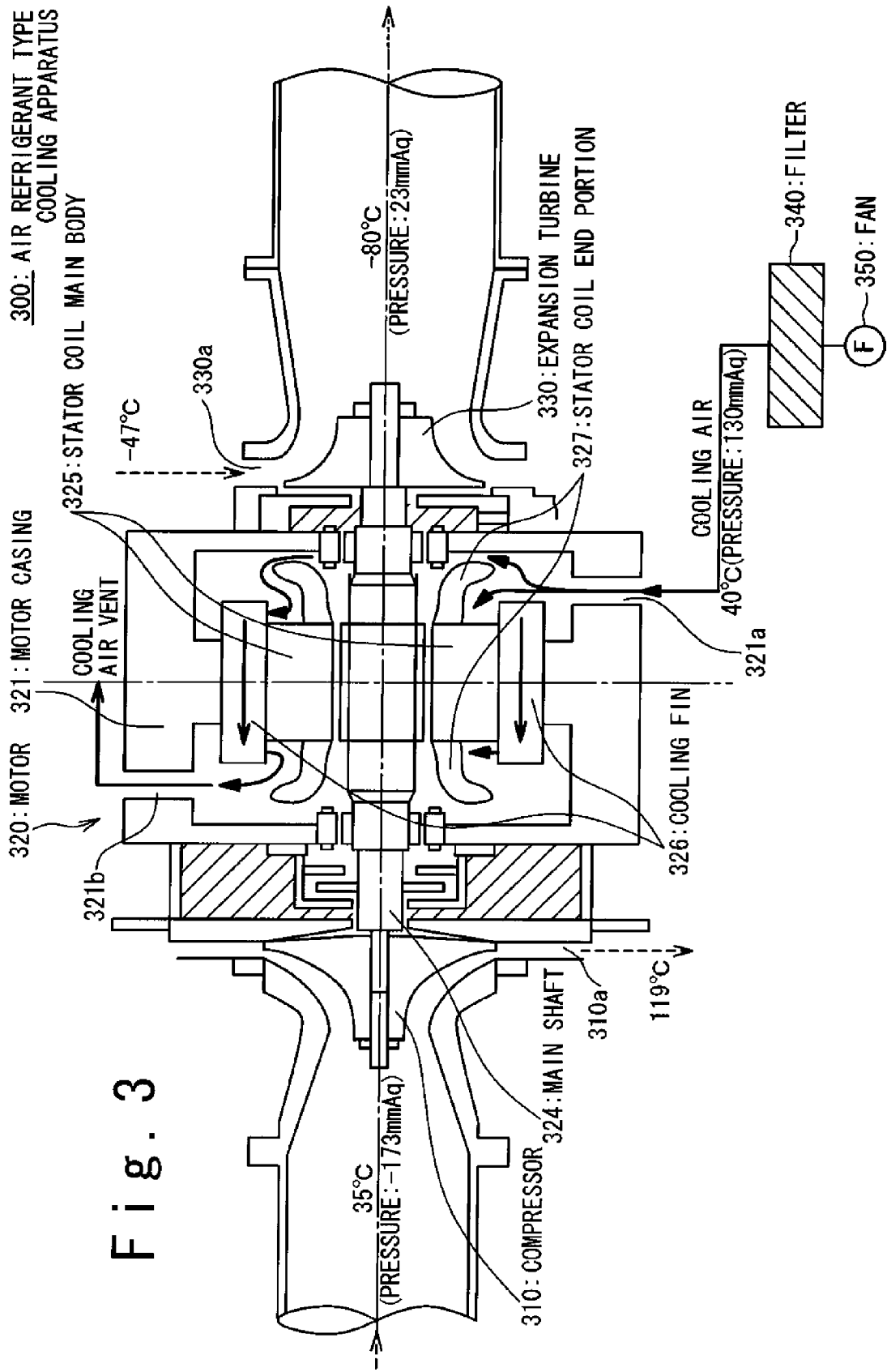
FIG. 3 is a cross sectional diagram showing a schematic configuration of an air refrigerant cooling/heating device according to the first embodiment.

FIG. 3 shows a cross section of a schematic configuration of an air refrigerant type cooling apparatus 300 according to the first embodiment of the present invention. The air refrigerant type cooling apparatus 300 in the present embodiment includes a motor 320, a compressor 310, and an expansion turbine 330. The compressor 310 is connected to one end of the motor 320 in the shaft direction thereof. The expansion turbine 330 is also connected to the other end of the motor 320 in the shaft direction thereof in the opposite side of the compressor 310. The motor 320 is centrally positioned between the compressor 310 and the expansion turbine 330, and includes a main shaft 324 being a rotational driving portion to be inserted into a motor casing 321, a stator coil main body 325 for driving the main shaft 324, and stator coil end portions 327 which are symmetrically positioned in the shaft direction across the stator coil main body 325.

Explained next will be an operation principle of the air refrigerant type cooling apparatus 300 according to the present embodiment.

An object of the air refrigerant type cooling apparatus 300 in the present embodiment is to enhance efficiency by a high speed rotation, in which a high reliability is required at the time of an actual operation.

A rotational driving force is initially generated for the main shaft 324 by an electromagnetic force between the main shaft 324 inserted into the motor casing 321 of the motor 320 and the stator coil main body 325 along with the stator coil end portion 327. This rotational driving force causes the main shaft 324 of the motor 320 to rotate to the stator coil main body 325 and the stator coil end portion 327. At the time of actually operating the motor 320, heat is generated in the inside of the motor 320 by the rotation of the main shaft 324. In a conventional motor, heat generated in the inside of the motor is mostly generated from the stator coil main body 325. However, if a motor is controlled by using a general-purpose inverter plate while rotating the motor at high speed, the frequency of the inverter needs to be lowered by reducing the number of poles of the motor. It is also necessary to lower the frequency of the inverter in order to reduce the ion loss of the motor.

If the pole number of the motor is reduced, a ratio of the length in the stator coil end portion 327 to the length of the stator coil main body 325 is made larger in the configuration of the motor. If the ratio of the length in the stator coil end portion 327 is made larger, a heating value from the stator coil end portion 327 is increased at the time of driving the motor 320.

In the present embodiment, a cooling air intake port 321a and a cooling air exhaust port 321b are arranged in the motor casing 321 for the purpose of efficiently exhausting the heat generated in the stator coil end portion 327 in particular to the outside of the motor 320. The cooling air intake port 321a and the cooling air exhaust port 321b are arranged in the vicinity of the stator coil end portion 327 and a cooling fin 326 respectively. At the time of actually operating the motor 320, cooling air (130 mmAq, 4° C.) is sent from the cooling air intake port 321a to an inside of the motor casing 321 by using a fan 350 which is disposed in the outside of the air refrigerant type cooling apparatus 300 through a filter 340. The cooling air which was taken into the inside of the motor casing 321 to cool down a motor driving portion including the main shaft 324, the stator coil main body 325, and the stator coil end 327 is exhausted to an outside of the motor casing 321 from the cooling air exhaust port 321b.

In the air refrigerant type cooling apparatus 300 according to the present embodiment, the cooling fin 326 is disposed between the stator coil main body 325 and the motor casing. Via the cooling fin 326, heat generated from the stator coil main body 325 is cooled down by cooling air sent to the inside of the motor 320 from the cooling air intake port 321a, and exhausted to the outside of the motor casing 321 by passing through the cooling air exhaust port 321b.

In the present embodiment, a pressure difference is generated between the inside and outside of the motor casing 321 for the purpose of exhausting heat generated from the stator coil end portion 327 and the cooling fin 326 to be stored in the inside of the motor casing 321 in the motor 320 to the outside of the motor casing 321. Although a positive pressure is applied to generate the pressure difference by connecting the cooling air intake port 321a arranged in the motor casing 321 to the fan 350 provided in the outside of the motor 320 in the present embodiment, a negative pressure may be applied by connecting to the compressor or the like. In the case of applying a negative pressure by the compressor or the like, there is an advantage that foreign matters or the like to be mixed into the inside of the motor are promptly exhausted to the outside of the motor, and in the case of applying a positive pressure by the fan or the like, refrigerant air at high temperatures and low temperatures which flows into the vicinity of a bearing of the main shaft through a labyrinth portion is cut off. Therefore, there is an advantage of extending the lifetime of components in the inside of the motor and improving reliability of the motor as a whole.

The cooling fin 326 is also arranged between the stator coil main body 325 and the motor casing for the purpose of efficiently exhausting heat from the inside of the motor. Furthermore, the cooling air intake port 321a and the cooling air exhaust port 321b are arranged in the vicinity of the stator coil end portion 327 and the cooling fin 326 in the motor casing 321 respectively. Therefore, high temperatures caused by heat generated in the inside of the motor 320 are prevented and stable high speed rotation is sustained. Accordingly, the lifetime of components in the main shaft and stator is extended in spite of the high speed rotation and reliability in the motor is improved. As a result, it is possible to realize the highly efficient and highly reliable air refrigerant cooling device 210.

Since the air refrigerant type cooling apparatus according to the present invention can be applied to freezing, chilling and air conditioning/cooling by changing the temperature and pressure level of a system, a freezing device, a chilling device, and an air conditioning/cooling device are also included therein. Although explanation was made exclusively for the case of refrigeration in the present embodiment, it can also be applied the case of chilling and air conditioning/cooling by changing the temperature and pressure level of a system.

(Second Embodiment)

Figure 4:
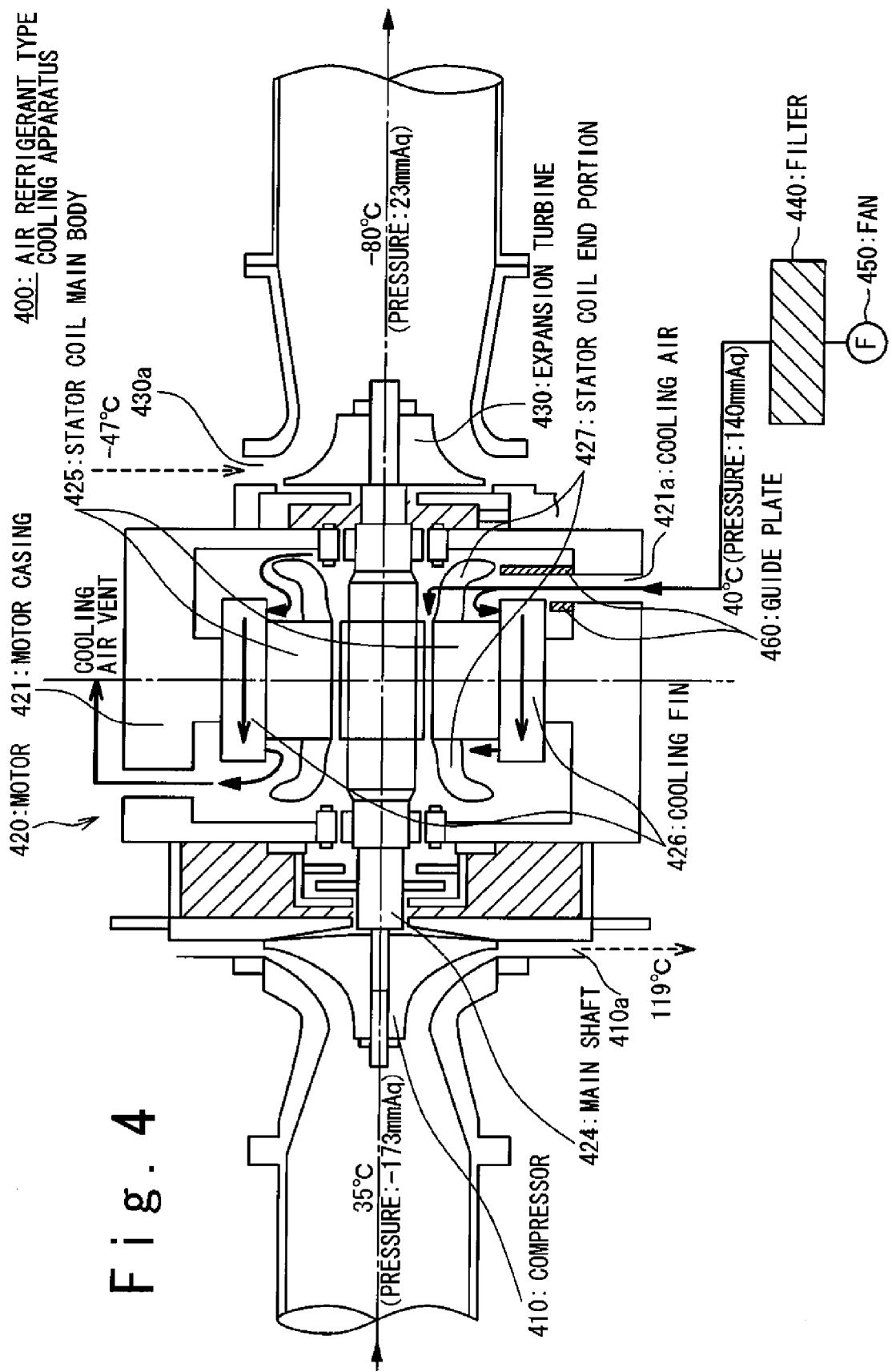
FIG. 4 is a cross sectional diagram showing a schematic configuration of an air refrigerant cooling/heating device according to the second embodiment.

FIG. 4 shows a cross section of a schematic configuration of an air refrigerant type cooling apparatus 400 according to a second embodiment of the present invention. A basic configuration of the air refrigerant type cooling apparatus 400 according to the present embodiment is similar to that of the air refrigerant type cooling apparatus 300 according to the first embodiment. It is also aimed to enhance efficiency in the device as whole by high speed rotation of a motor 420 being a configuration requirement in the same manner with the first embodiment, in which high reliability is required at the time of an actual operation. In the present embodiment, a guide plate 460 is further provided in a motor casing 421 to control cooling air introduced from a cooling air intake port 421a so as to flow into a stator coil end portion 427.

The air refrigerant type cooling apparatus 400 according to the present embodiment includes a motor 420, a compressor 410, and an expansion turbine 430. The compressor 410 is connected in one end of the motor 420 in the shaft direction thereof. The expansion turbine 430 is also connected to the other end of the motor 420 in the shaft direction thereof in the opposite side of the compressor 410. The motor 420 is centrally positioned between the compressor 410 and the expansion turbine 430, and includes a main shaft 424 being a rotational driving portion to be inserted into the motor casing 421, and a stator for driving the main shaft 424. The stator includes a stator coil main body 425, and the stator coil end portions 427 which are symmetrically positioned in the shaft direction across the stator coil main body 425.

An operation principle of the air refrigerant type cooling apparatus 400 in the present embodiment is basically similar to the one explained in the air refrigerant type cooling apparatus 300 according to the first embodiment, thereby explanation thereof will be omitted here. However, in the present embodiment, the guide plate 460 is arranged in the internal wall of the motor casing 421 to rectify cooling air introduced from the cooling air intake port 421a so as to flow into the stator coil end portion 427. Therefore, the flowrate of cooling air exposed to the stator coil end portion 427 is increased in comparison with the first embodiment, and heat generated from the stator coil end portion 427 is efficiently exhausted to the outside of the motor 420 by the cooling air through a cooling air exhaust port 421b arranged in the motor casing 421.

Although, a positive pressure is loaded in the present embodiment to generate the above described cooling air by connecting the cooling air intake port 421a arranged in the motor casing 421 to a fan 450 disposed in the outside of the motor 420, a negative pressure may also be applied by connecting to the compressor or the like. Moreover, for the purpose of efficiently exhausting heat from the stator coil main body 425, a cooling fin 426 is arranged between the stator coil main body 425 and the motor casing. The cooling air intake port 421a and the cooling air exhaust port 421b which become a passage of cooling air between the inside and outside of the motor casing 421 are arranged in the vicinity of the stator coil end portion 427 and the cooling fin 426 in the motor casing 421. Furthermore, in the present embodiment, the guide plate 460 is arranged in the vicinity of the cooling air intake port 421a on the internal wall of the motor casing 421 so that cooling air which is sent from the cooling air intake port 421a into the motor casing 421 is efficiently exposed to the stator coil end portion 427.

As a result, high temperatures caused by the heat generated in the inside of the motor are prevented, and stable high speed rotation is sustained. It is therefore possible to realize the highly efficient and highly reliable air refrigerant cooling device 400 provided with the motor 420.

(Third Embodiment)

FIG. 2 shows a schematic diagram of an air refrigerant cooling/heating system 100 according to a third embodiment.

The air refrigerant cooling/heating system 100 according to the present embodiment includes the air refrigerant type cooling apparatuses 300 and 400 according to the first or second embodiment, the first heat exchanger 120, the second heat exchanger 130, the cooling chamber 140, a filter 150, and a fan 160.

A refrigerant used in the present embodiment is air, so that anxiety about environmental destruction caused by the ozone refrigerant which has been conventionally used is removed.

In the present embodiment, the outlet of the compressor in the air refrigerant type cooling apparatuses 300 and 400 is connected to an inlet of the first heat exchanger 120 by a pipe. An outlet of the first heat exchanger 120 is connected to an inlet of the second heat exchanger 130 by the pipe. The outlet of the second heat exchanger 130 is connected to the inlet of the expansion turbine in the air refrigerant type cooling apparatuses 300 and 400 by the pipe. The outlet of the expansion turbine in the air refrigerant type cooling apparatuses 300 and 400 is connected to the inlet of refrigerant air in the cooling chamber 140 by the pipe. The outlet of air refrigerant in the cooling chamber 140 is then connected to the inlet of the compressor in the air refrigerant type cooling apparatuses 300 and 400 via the second heat exchanger 130 by the pipe. Moreover, in order to cool down the inside of the motor in the air refrigerant type cooling apparatuses 300 and 400, the fan 160 is connected to an intake hole provided in the motor casing via the filter 150.

Explained next will be an operation principle of the air refrigerant cooling/heating system 100 according to the present embodiment. The air refrigerant cooling/heating system 100 in the present embodiment is a circulation type system using air as a refrigerant, in which the cooling chamber 140 is integrated into a circulation loop thereof so as to directly send refrigerant air into the cooling chamber 140. The cooling chamber here includes a freezer and a refrigerator or the like.

The present invention can also be applied to the case of using the cooling chamber 140 in a semi-sealed state for providing frozen foods for example, in which a belt conveyor is used to pass foods or the like through a space cooled down by the air refrigerant type cooling apparatuses 300 and 400, other than using it for storing products in low temperatures. Furthermore, it is also possible to use the cooling chamber as a medicinal product reactor to freeze medicinal products in a manufacturing process thereof.

Refrigerant air of 35° C. (pressure: −173 mmAq) which was sent to the inlet of the compressor in the air refrigerant type cooling apparatuses 300 and 400 is initially compressed by the compressor and exhausted from the outlet of the compressor as an air refrigerant of 119° C. The exhausted air refrigerant of 119° C. is sent to the first heat exchanger 120 and cooled down to 43° C. in the first heat exchanger 120. The air refrigerant which was cooled down to 43° C. is further sent to the second heat exchanger 130 and subjected to heat exchange so as to be cooled down to the vicinity of −47° C. The air refrigerant which was cooled down to −47° C. is sent to the inlet of the expansion turbine in the air refrigerant type cooling apparatuses 300 and 400 and adiabatically expanded so as to be cooled down to −80° C. The refrigerant air which was cooled down to −80° C. is sent to the cooling chamber 140 to cool down products directly stored in the cooling chamber 140. In the present embodiment, the temperature in the cooling chamber 140 is kept in the vicinity of approximately −55° C. The refrigerant air of −55° C. which was exhausted from the cooling chamber 140 is sent to the second heat exchanger 130 and subjected to heat exchange with the air refrigerant sent from the first heat exchanger 120, so that the air refrigerant sent from the first heat exchanger 120 is cooled down to −47° C. Thereafter, the refrigerant air from the cooling chamber 140 which was subjected to heat exchange in the second heat exchanger 130 and heated up to 35° C. is sent to the inlet of the compressor in the air refrigerant type cooling apparatuses 300 and 400 again, so that a circulation system of the refrigerant air is established. Meanwhile, cooling air is sent from the fan 160 into the inside of the motor via the filter 150 by passing through a cooling hole of the motor casing in order to cool down the inside of the motor. The cooling air is then opened to the atmosphere from the inside of the motor through the cooling hole of the motor casing after cooling down the inside of the motor.

In the present embodiment, air is used as a refrigerant so that there is no anxiety about environmental destruction in comparison with a conventional refrigerant such as fluorocarbon. Moreover, the highly efficient and highly reliable air refrigerant cooling/heating system 100 which is capable cooling down the inside of the cooling chamber 140 to a desired temperature and includes the minimum heat exchanger can be provided by using the air refrigerant type cooling apparatuses 300 and 400 exhibited in the first or second embodiment.

Since the configuration in the present embodiment is essentially simple, the facility cost as a whole is reduced, and there is no need to provide a unit cooler and a refrigerant pipe in the chamber due to the refrigerant air at low temperatures which is directly sent into the cooling chamber 140. Therefore, a sharp cut in the construction cost is realized.

(Fourth Embodiment)

Figure 5:
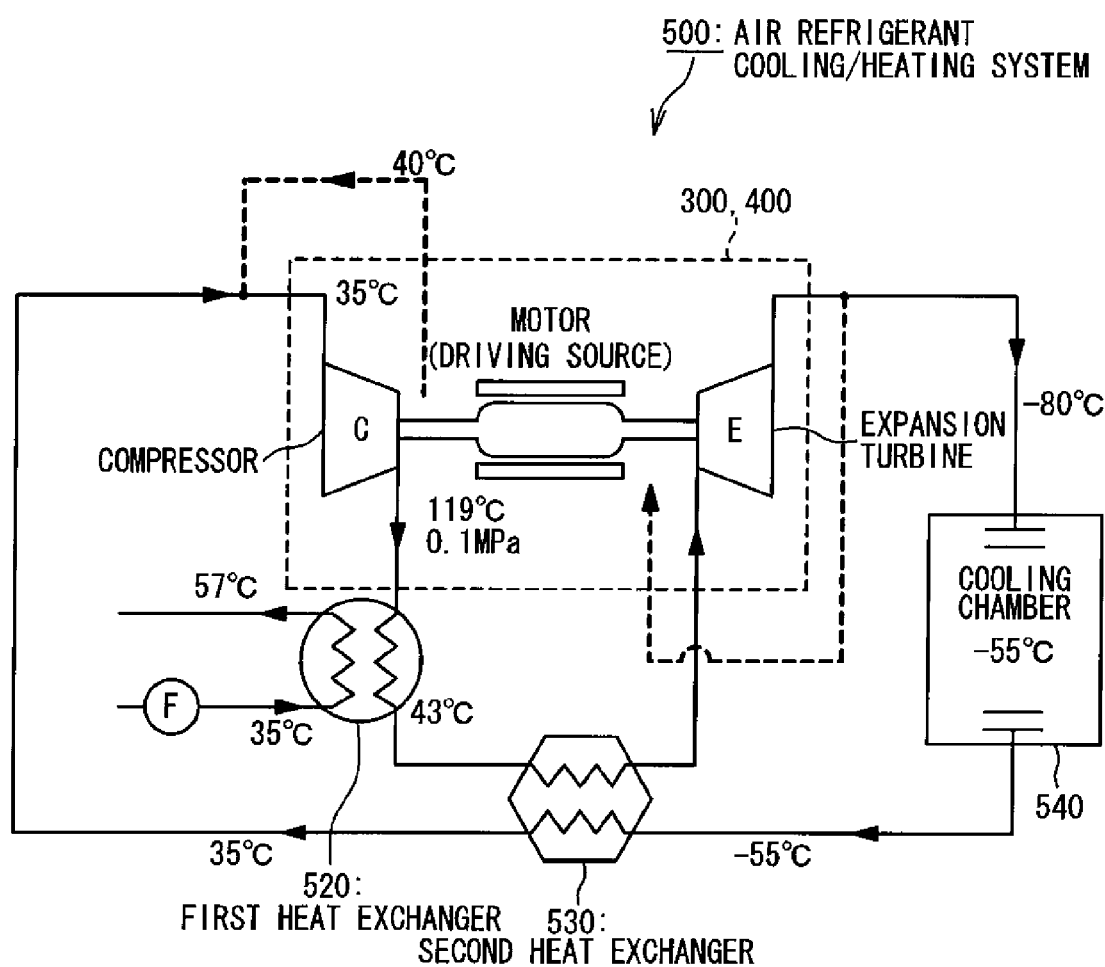
FIG. 5 shows an air refrigerant cooling/heating system according to the fourth embodiment.

FIG. 5 shows a schematic diagram of an air refrigerant cooling/heating system 500 according to a fourth embodiment.

A basic configuration of the air refrigerant cooling/heating system 500 in the present embodiment is similar to that of the air refrigerant cooling/heating system 100 according to the third embodiment. However, there is a difference in the configuration in the air refrigerant type cooling apparatuses 300 and 400 for motor cooling being a configuration requirement.

The air refrigerant cooling/heating system 500 according to the present embodiment includes the air refrigerant type cooling apparatuses 300 and 400 in the first or second embodiment, a first heat exchanger 520, a second heat exchanger 530, and a cooling chamber 540.

Since a configuration and an operation principle in the present embodiment are similar to those of the air refrigerant cooling/heating system 100 in the third embodiment, explanation thereof will be omitted.

In the present embodiment, a pipe connected to the outlet of the expansion turbine in the air refrigerant type cooling apparatuses 300 and 400 is branched, one of which is connected to the inlet of the cooling chamber 540 and the remaining one is connected to the intake hole arranged in the motor casing. The intake hole arranged in the motor casing of the air refrigerant type cooling apparatuses 300 and 400 is also connected to the inlet of the compressor in the air refrigerant type cooling apparatuses 300 and 400 by the pipe.

Therefore, while the air refrigerant cooling/heating system 500 is being driven, refrigerant air of −80° C. which is constantly exhausted from the outlet of the expansion turbine in the air refrigerant type cooling apparatuses 300 and 400 is partially sent into the inside of the motor in the air refrigerant type cooling apparatuses 300 and 400, so that the inside of the motor is cooled down. The cooled refrigerant air is also exhausted from the motor when it reaches approximately 40°

C. and again sent to the inlet of the compressor in the air refrigerant type cooling apparatuses 300 and 400. Accordingly, in the present embodiment, the temperature in the cooling chamber 540 is kept at low temperatures by the refrigerant air, while the inside of the motor in the air refrigerant type cooling apparatuses 300 and 400 is cooled down simultaneously.

In the present embodiment, an effect similar to the third embodiment is provided, and the inside of the motor in the air refrigerant type cooling apparatuses 300 and 400 can be efficiently cooled down by using the circulation type refrigerant air. As a result, the highly reliable air refrigerant cooling/heating system 500 can be provided at much less facility cost than the air refrigerant cooling/heating systems 300 and 400 according to the third embodiment.

(Fifth Embodiment)

Figure 6:
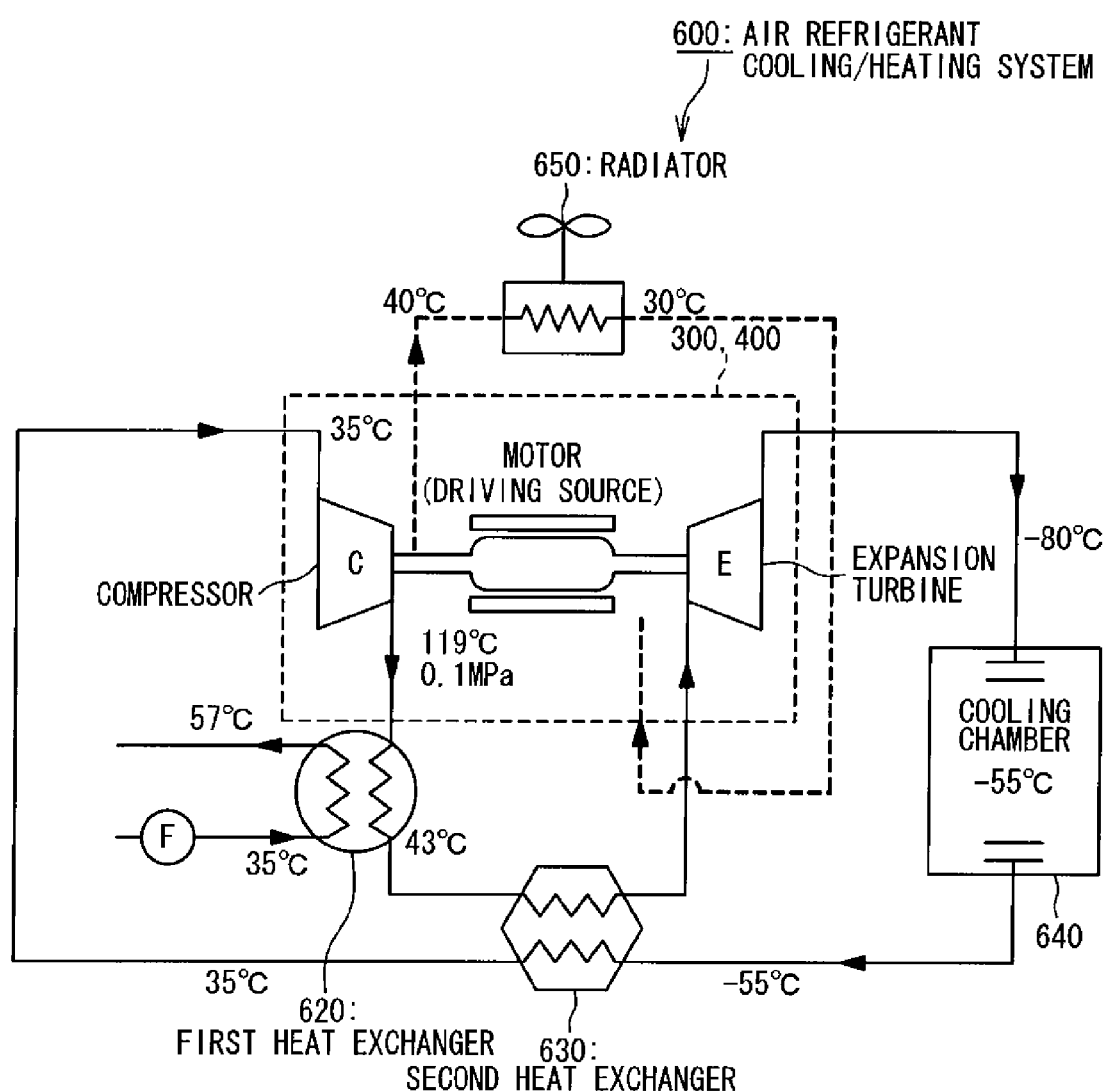
FIG. 6 shows an air refrigerant cooling/heating system according to the fifth embodiment.

FIG. 6 shows a schematic diagram of an air refrigerant cooling/heating system 600 according to a fifth embodiment.

A basic configuration of the air refrigerant cooling/heating system 600 in the present embodiment is similar to that of the air refrigerant cooling/heating systems 100 and 500 in the third and fourth embodiments. However, there is a difference in the configuration in the air refrigerant type cooling apparatuses 300 and 400 for motor cooling being a configuration requirement.

The air refrigerant cooling/heating system 600 according to the present embodiment includes the air refrigerant type cooling apparatuses 300 and 400 in the first or second embodiment, a first heat exchanger 620, a second heat exchanger 630, a cooling chamber 640, and a radiator 650 for cooling down the motor in the air refrigerant type cooling apparatuses 300 and 400.

Since a configuration and an operation principle in the present embodiment are similar to those of the air refrigerant cooling/heating systems 100 and 500 in the third and fourth embodiments, explanation thereof will be omitted.

In the present embodiment, the radiator 650 is disposed in the outside of the air refrigerant type cooling apparatuses 300 and 400. The inlet and outlet of the radiator 650 are connected to the intake holes which are arranged in the motor casing and correspond to the inlet and outlet thereof respectively.

While the air refrigerant cooling/heating system 600 is being driven, the radiator 650 is simultaneously driven to circulate air in the inside of the motor in the air refrigerant type cooling apparatuses 300 and 400. Cooling air of 40° C. to be exhausted from the inside of the motor is cooled down to 30° C. by the radiator 650.

The present embodiment has an effect similar to the third and fourth embodiments, and cooling efficiency of the motor in the air refrigerant type cooling apparatuses 300 and 400 is enhanced by driving the radiator 650, so that it is possible to provide the air refrigerant cooling/heating system 600 with much higher reliability than the air refrigerant cooling/heating systems 100 and 500 in the third and fourth embodiments.

(Sixth Embodiment)

Figure 7:
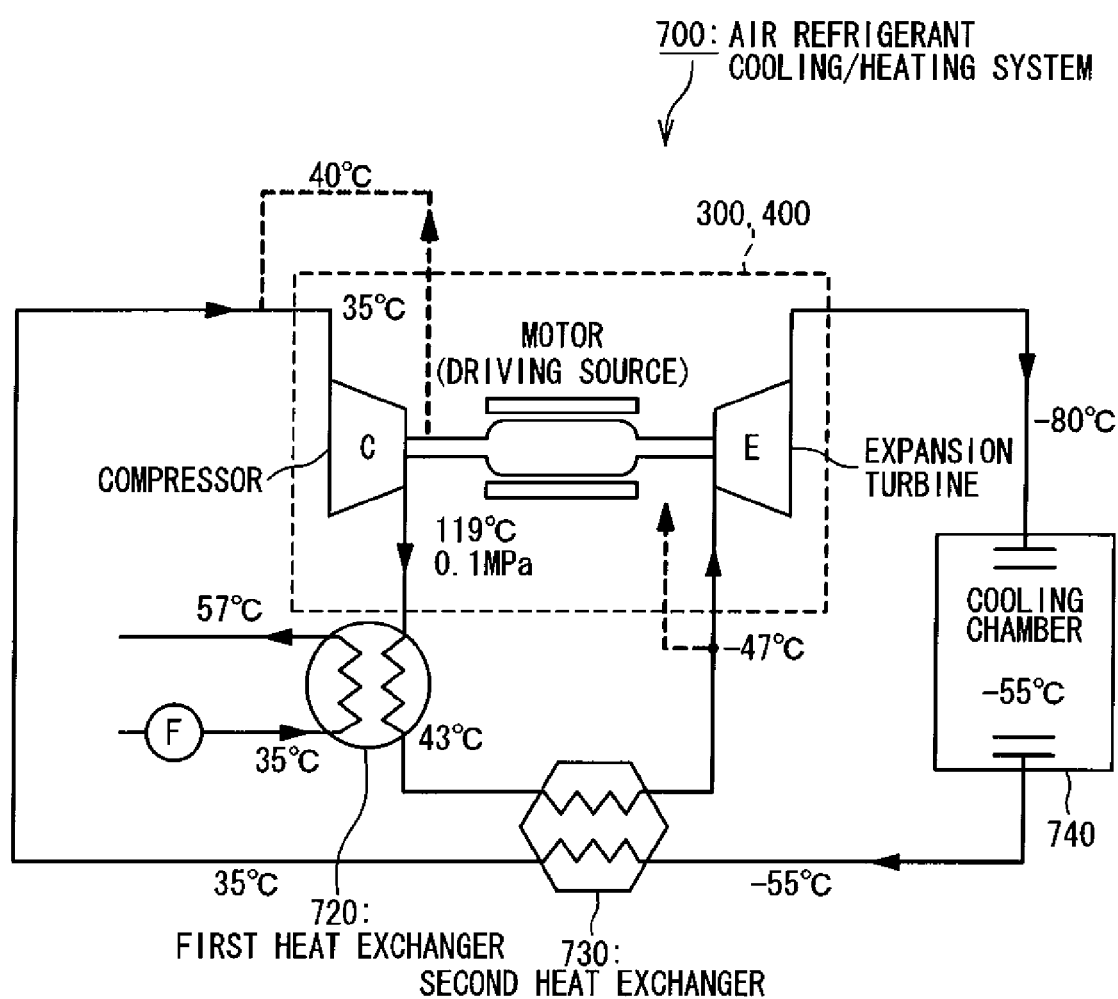
FIG. 7 shows an air refrigerant cooling/heating system according to the sixth embodiment.

FIG. 7 shows a schematic diagram of an air refrigerant cooling/heating system 700 according to a sixth embodiment.

A basic configuration of the air refrigerant cooling/heating system 700 in the present embodiment is similar to that of the air refrigerant cooling/heating systems 100, 500 and 600 in the third to fifth embodiments. However, there is a difference in the configuration in the air refrigerant type cooling apparatuses 300 and 400 for motor cooling being a configuration requirement.

The air refrigerant cooling/heating system 700 according to the present embodiment includes the air refrigerant type cooling apparatuses 300 and 400 in the first or second embodiment, a first heat exchanger 720, a second heat exchanger 730, and a cooling chamber 740.

Since a configuration and an operation principle in the present embodiment are similar to those of the air refrigerant cooling/heating systems 100, 500 and 600 in the third to fifth embodiments, explanation thereof will be omitted.

In the present embodiment, the pipe connected to the outlet of the second cooling heat exchanger 730 is branched, one of which is connected to the inlet of the expansion turbine, and the remaining one is connected to the intake hole arranged in the motor casing in the air refrigerant type cooling apparatuses 300 and 400. The intake hole arranged in the motor casing in the air refrigerant type cooling apparatuses 300 and 400 is also connected to the inlet of the compressor in the air refrigerant type cooling apparatuses 300 and 400 by the pipe.

Therefore, while the air refrigerant cooling/heating system 700 is being driven, refrigerant air of −47° C. which is constantly exhausted from the outlet of the second cooling heat exchanger 730 is partially sent to the inside of the motor in the air refrigerant type cooling apparatuses 300 and 400, so that the inside of the motor is cooled down. Moreover, the cooled refrigerant air is exhausted from the motor when it reaches approximately 40° C., and sent again to the inlet of the compressor in the air refrigerant type cooling apparatuses 300 and 400. As a result, in the present embodiment, the temperature in the cooling chamber 740 is kept at low temperatures, while the inside of the motor in the air refrigerant type cooling apparatuses 300 and 400 is cooled down simultaneously.

The present embodiment has an effect similar to the fourth and fifth embodiments, and is capable of efficiently cooling down the inside of the motor in the air refrigerant type cooling apparatuses 300 and 400 by using circulation type refrigerant air. It is therefore possible to provide the highly reliable air refrigerant cooling/heating system 700 at much lower facility cost than the air refrigerant cooling/heating systems 100 and 600 in the third and fifth embodiments.

(Seventh Embodiment)

Figure 8:
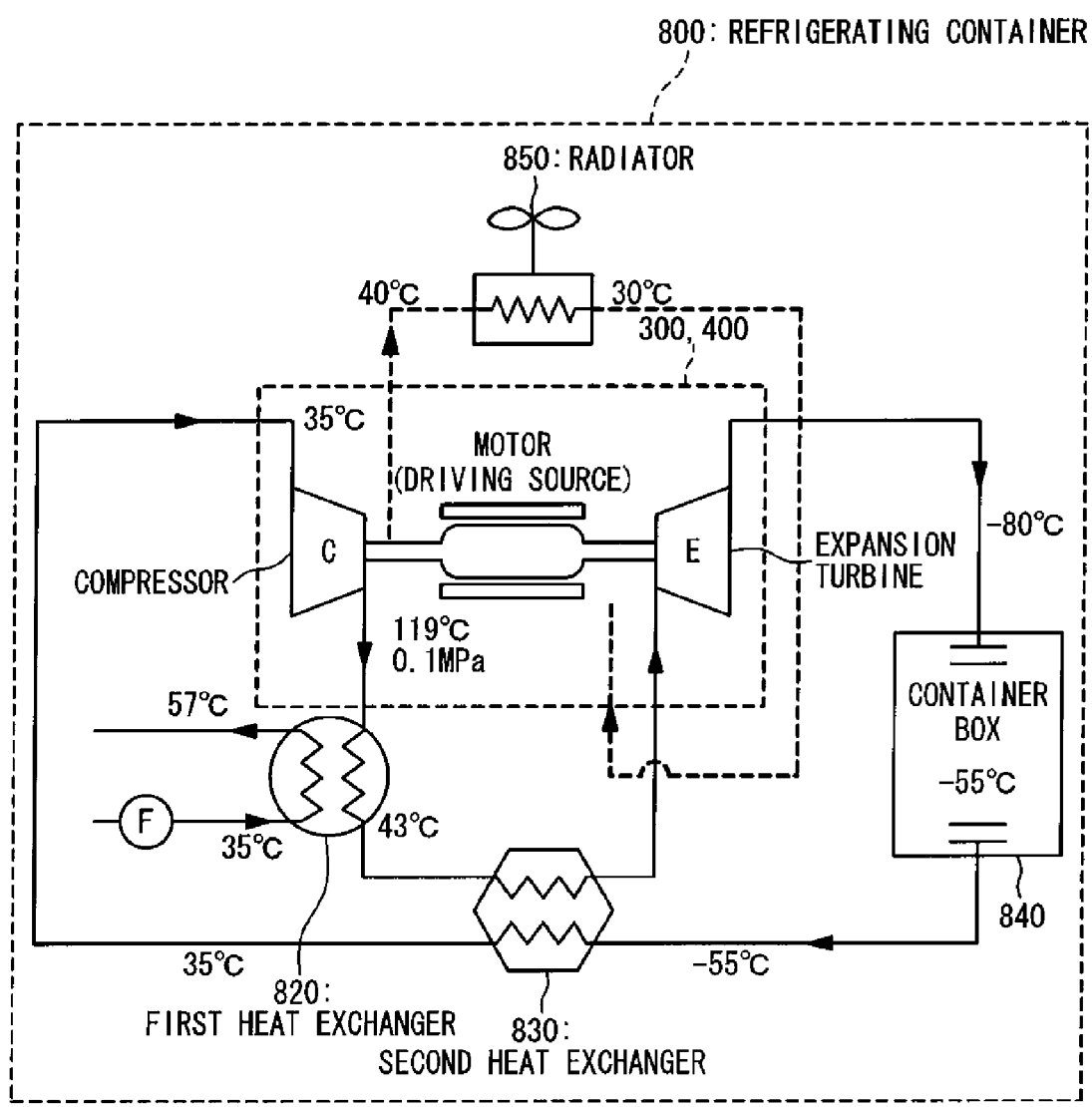
FIG. 8 shows a refrigerating container according to the seventh embodiment.

FIG. 8 shows a schematic diagram of a refrigerating container 800 according to a seventh embodiment.

A basic configuration of the refrigerating container 800 in the present embodiment is similar to that of the air refrigerant cooling/heating system 600 in the fifth embodiment. However, an entire system is configured to be portable.

The refrigerating container 800 according to the present invention includes the air refrigerant type cooling apparatuses 300 and 400 in the first or second embodiment, a first heat exchanger 820, a second heat exchanger 830, a container box 840, and a radiator 850 for cooling down the motor in the air refrigerant type cooling apparatuses 300 and 400.

Since a configuration and an operation principle in the present embodiment are similar to those of the air refrigerant cooling/heating systems 100 and 600 in the third and fifth embodiments, explanation thereof will be omitted here.

In the present embodiment, the radiator 850 is disposed in the outside of the air refrigerant type cooling apparatuses 300 and 400. The inlet and outlet of the radiator 850 are connected to the intake holes which are arranged in the motor casing and correspond to the inlet and outlet thereof respectively. While the refrigerating container 800 is being driven, the radiator 850 is simultaneously driven to circulate air in the inside of the motor in the air refrigerant type cooling apparatuses 300 and 400. Cooling air of 40° C. to be exhausted from the inside of the motor is also cooled down to 30° C. by the radiator 850.

Furthermore, in the present embodiment, configuration requirements including the air refrigerant type cooling apparatuses 300 and 400, the first heat exchanger 820, the second heat exchanger 830, the container box 840, and the radiator 850 are entirely configured to be portable, so that the entire system can be loaded onto vehicles, ships and rail loads or the like to transport products while being frozen and preserved in the container box 840.

In the present embodiment, the entire system is made to be portable so that the highly reliable air refrigerant cooling/heating system can be provided for freezing transportation which is expected to have increasing demand hereafter. Although explanation was made in the present embodiment exclusively for the case of freezing, application to the case of chilling and air conditioning/cooling is also possible by changing the temperature and pressure level of the system in the same manner with the other embodiments.

The invention claimed is:

1. An air refrigerant type cooling apparatus comprising:
    a motor which includes a motor casing; a main shaft, a stator coil stored in said motor casing and configured to rotate said main shaft, and a heat radiating section adapted to radiate heat accumulated in said stator coil;
    a compressor connected to said main shaft;
    an expansion turbine connected to said main shaft; and
    a pressure difference generating section adapted to generate a pressure difference between an inside and an outside of said motor.

2. The air refrigerant type cooling apparatus according to claim 1, wherein said stator coil includes a stator coil main body and stator coil end portions positioned around said stator coil main body, and
    said pressure difference generating section adapted to generate a pressure difference between the inside and the outside of said motor uses an external pressure from the outside of said motor to generate, via a first intake hole and a second intake hole arranged in said motor casing, a pressure difference between the outside of said motor and a space with said heat radiating section and said stator coil end portion being disposed.

3. The air refrigerant type cooling apparatus according to claim 1, further comprising:
    a guide plate which is disposed in said motor casing and controls a direction of an air flow generated by an external pressure from the outside of said motor between the outside of said motor and a space with said heat radiating section and a stator coil end portion of said motor being disposed.

4. The air refrigerant type cooling apparatus according to claim 1, wherein said heat radiating section uses a cooling fin for heat radiation.

5. An air refrigerant cooling/heating system comprising:
    the air refrigerant type cooling apparatus according to claim 1;
    a first heat exchanger;
    a second heat exchanger;
    a cooling chamber; and
    a filter and a fan,
    wherein an outlet of said compressor is connected to an inlet of said first heat exchanger, an outlet of said first heat exchanger is connected to an inlet of said second heat exchanger, an outlet of said second heat exchanger is connected to an inlet of said expansion turbine, an outlet of said expansion turbine is connected to an inlet of said cooling chamber, an outlet of said cooling chamber is connected to an inlet of said compressor via said second heat exchanger, and
    said first intake hole provided in said motor casing is connected to said fan via said filter, and heat generated in the inside of said motor is exhausted from said second intake hole provided in said motor casing.

6. An air refrigerant cooling/heating system comprising:
    the air refrigerant type cooling apparatus according to claim 1;
    a first heat exchanger;
    a second heat exchanger and
    a cooling chamber,
    wherein an outlet of said compressor is connected to an inlet of said first heat exchanger, an outlet of said first heat exchanger is connected to an inlet of said second heat exchanger, an outlet of said second heat exchanger is connected to an inlet of said expansion turbine, an outlet of said expansion turbine is connected to an inlet of said cooling chamber, an outlet of said cooling chamber is connected to an inlet of said compressor via said second heat exchanger, and
    an air in a pipe connected to the outlet of said expansion turbine is guided to a first intake hole arranged in said motor casing, while a second intake hole arranged in said motor casing is connected to the inlet of said compressor.

7. An air refrigerant cooling/heating system comprising:
    the air refrigerant type cooling apparatus according to claim 1;
    a first heat exchanger;
    a second heat exchanger;
    a cooling chamber; and
    a radiator,
    wherein an outlet of said compressor is connected to an inlet of said first heat exchanger, an outlet of said first heat exchanger is connected to an inlet of said second heat exchanger, an outlet of said second heat exchanger is connected to an inlet of said expansion turbine, an outlet of said expansion turbine is connected to an inlet of said cooling chamber, an outlet of said cooling chamber is connected to an inlet of said compressor via said second heat exchanger, and
    said radiator is disposed in an outside of said air refrigerant type cooling apparatus, and an inlet and an outlet of said radiator are connected to intake hole and outlet hole arranged in said motor casing respectively.

8. An air refrigerant cooling/heating system comprising:
    the air refrigerant type cooling apparatus according to claim 1;
    a first heat exchanger;
    a second heat exchanger; and
    a cooling chamber,
    wherein an outlet of said compressor is connected to an inlet of said first heat exchanger, an outlet of said first heat exchanger is connected to an inlet of said second heat exchanger, an outlet of said second heat exchanger is connected to an inlet of said expansion turbine, an outlet of said expansion turbine is connected to an inlet of the cooling chamber, an outlet of said cooling chamber is connected to an inlet of said compressor via said second heat exchanger, and
    an air in a pipe connected to the outlet of said second heat exchanger is guided to a first intake hole arranged in said motor casing, while a second intake hole arranged in said motor casing is connected to the inlet of said compressor.

9. A refrigerating container comprising:
    the air refrigerant type cooling apparatus according to claim 1;
    a first heat exchanger;
    a second heat exchanger;
    a container box placed in said refrigeration container; and
    a radiator, wherein an outlet of said compressor is connected to an inlet of a first heat exchanger, an outlet of said first heat exchanger is connected to an inlet of said second heat exchanger, an outlet of said second heat exchanger is connected to an inlet of said expansion turbine, an outlet of said expansion turbine is connected to an inlet of said container box, an outlet of said container box is connected to an inlet of said compressor via said second heat exchanger, and said radiator is disposed in an outside of said air refrigerant type cooling apparatus, and an inlet and an outlet of said radiator is connected to an inlet and an outlet formed in said motor casing respectively.

* * * * *